Patented Apr. 13, 1937

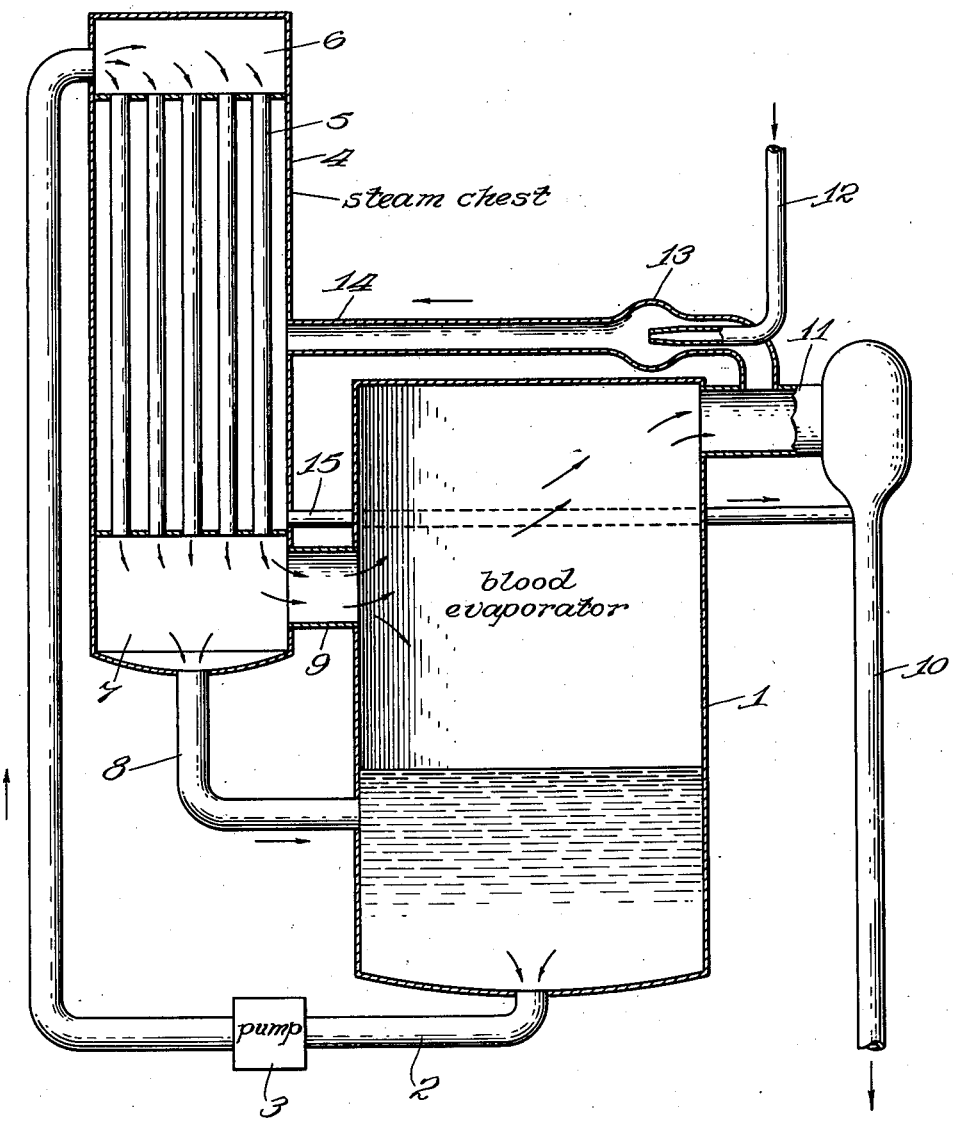

2,076,597

UNITED STATES PATENT OFFICE 2,076,597

METHOD OF PRODUCING LIQUID EVAPORATED BLOOD

Adrian A. Robinson and Henry C. Dormitzer, Chicago, Ill., assignors to Wilson & Co., Inc., a corporation of Delaware Application March 16, 1935, Serial No. 11,508

7 Claims. (Cl. 99—21)

This invention relates to a liquid evaporated blood and a method of producing the same.

In the present commercial practice there are two methods of utilizing animal blood as produced in the commercial stockyards. In its cheapest form the blood is mixed with fertilizer and sold for that purpose. The higher quality material is spray-dried to substantial dryness and is sold in dried form for use in various industries including the blue industry.

Spray-dried blood when used is redissolved in water to produce a liquid having the desired degree of dilution. In the operation of spray-drying however the blood corpuscles are ruptured and "laked", at the same time a somewhat more insoluble matter is produced than in the present process.

By proceeding in accordance with the present invention it is possible to produce a liquid evaporated blood product suitable for immediate use, and having most of its blood corpuscles unruptured and unlaked.

An apparatus for carrying out the process and for the production of the liquid product is illustrated in the drawing which shows a diagrammatic broken sectional elevation of an evaporator. The liquid evaporated blood is introduced in the evaporator 1 through a line (not shown), and is placed under a high vacuum, for example about 27½ inches of mercury, referred to 30". The liquid is pumped through the 6-inch line 2 by the pump 3 into the steam chest 4 which is provided with 620 1¼ inch internal diameter tubes 5, about 8 feet long. A preferred steam chest is approximately 12½ feet in height, with 1½ feet of head space 6, and 3 feet of separator space 7, at the bottom. The blood is pumped into the steam chest at about 240 gallons per minute, through the tubes 5, which are in contact with steam which is held at a temperature from 100 to 135° F., and preferably from 118 to 126° F. The liquid falls through the tubes rapidly, mostly in the form of a thin film. It is desired to secure sufficient evaporation relative to the size of the film that the sluggishness in the latter part of the tube due to its concentration shall be offset by the increased velocity due to the generated steam and to gravity. The comingled vapors and liquid are separated in the separating space 7, and the liquid products pass out through the 6-inch line 8, and the vapors pass out through the 2-foot space 9. It is desirable that the vapor velocity in the separator chamber shall not be such as to entrain any substantial quantity of the liquid materials. However by venting the outlet 9 into the evaporator, a substantial diminution of vapor velocity is secured so that entrained liquid will be precipitated. Moreover the outlet 9 serves as an overflow for the liquid in case the flow is too rapid for the 6-inch line 8 and the cascading liquid from outlet 9 furnishes an additional opportunity for the evaporation of water therefrom. The vapors from the evaporator pass to the barometric condenser 10 through the line 11. This line is also connected to the live steam inlet 12 in which steam is admitted under high pressure, for example, under 65 pounds. An ejector 13 is provided which causes a recirculation of a considerable proportion, generally about one-half, of the vapors through the steam chest, with consequent heat economy. The line 14 connects the ejector with the steam chest and the spent steam is removed from the line 15.

In carrying out the operation it is preferred to adjust the rate of flow and the temperature and amount of the steam in such manner that the temperature of the liquid will be about 100 to 110° F., and the steam will be from 118 to 126° F. The preferred combination is 100° F. for the liquid in the evaporator body and 118° F. for the steam. The blood should never be over 125° or the steam over 135°. A preferred vacuum is about 27½ inches in the evaporator and about 26 inches in the steam chest, referred to 30".

The evaporator shown is approximately 147 inches in height and 84 inches in diameter and is filled about two-fifths full with liquid blood. The operation is carried out rapidly enough so that the desired concentration is reached within two or three hours. If a longer period is taken, the blood may spoil in the system.

It is preferred to evaporate the material until a concentration of 30 to 45% solids has been reached, preferably about 40%. The steam chest shown has a diameter of approximately 4½ feet.

It is preferred to carry out the process with defibrinated blood prepared in accordance with our co-pending application Serial No. 4,999, filed February 4, 1935. This product contains 15 to 17% blood solids which consists of 65 to 75% serum and 25 to 35% haemoglobin. The normal content is about 70% serum and 30% haemoglobin. The process, however, is fully applicable to other types of liquid blood.

Inasmuch as blood serum contains about 8% solids and the haemoglobin from 30 to 40% or an average of about 35% of solids, the solids of the blood produced in accordance with our copending application will contain from about 27 to 44% of serum solids with the remainder haemoglobin solids. The product therefore contains about 8.1 to 19.8% of serum solids (27 to 44% of the 30 to 45% of solids present) or with an average solid content in the serum (36%), the blood concentrate will contain from about 10.8 to 17.8% serum solids, depending on the total solid content.

The foregoing detailed description is given for clearness of understanding only, and no unnecessary limitations should be understood therefrom, but the appended claims should be construed as broadly as permissible in view of the prior art.

What we claim is new and desire to secure by Letters Patent is:

1. The method of evaporating liquid blood which comprises heating a liquid body of blood to a temperature of the order of 100 to 110° F. under a high vacuum while continuously circulating the liquid in the form of many small streams moving at high velocity through a heating zone, the temperature of the heating zone being maintained at all points below 135° F., and continuing the heating and circulation until the blood has a solid content of the order of 30 to 45%.

2. The method as set forth in claim 1, in which the temperature of the blood is approximately 100° F.

3. The method as set forth in claim 1, in which the temperature of the blood is approximately 100° F. and the temperature of the heating medium is approximately 118° F.

4. The method as set forth in claim 1, in which the heating surface temperature, the vacuum and the quantity of liquid blood are correlated so that the evaporation of the material to a content of 30 to 45% solids shall be completed in a time of the order of 2 to 3 hours.

5. The method as set forth in claim 1, in which the velocity of movement of the small streams of blood is continually increased in the direction of movement thereof to offset concentration of the evaporated blood.

6. The method of evaporating liquid blood which comprises heating a liquid body of blood to a temperature of the order of 100 to 110° F. under a high vacuum while continuously circulating the liquid in the form of many small streams moving at high velocity through a heating zone, the temperature of the heating zone being maintained at all points below 135° F., and no part of the liquid body being permitted to reach a temperature above 125° F., and continuing the heating and circulation until the proportion of solids in the blood has materially increased and cooling the blood before laking of any substantial portion thereof.

7. The method of evaporating liquid blood which comprises heating a liquid body of blood to a temperature of the order of 100 to 110° F. under a high vacuum while continuously circulating the liquid in the form of many small streams moving at high velocity through a heating zone, the temperature of the heating zone being maintained at all points below 135° F., and the heating and circulation being continued while the blood is unlaked and until the blood has a solid content of about 30 to 45%.

ADRIAN A. ROBINSON.
HENRY C. DORMITZER.